United States Patent [19]

Newman

[11] Patent Number: 4,667,106

[45] Date of Patent: May 19, 1987

[54] FIRE IDENTIFICATION AND DISCRIMINATION METHOD AND APPARATUS

[75] Inventor: Jeffrey S. Newman, Franklin, Mass.

[73] Assignee: Factory Mutual Research Corporation, Norwood, Mass.

[21] Appl. No.: 812,629

[22] Filed: Dec. 23, 1985

[51] Int. Cl.[4] ...................... G08B 17/10; G01N 23/02

[52] U.S. Cl. .................................... 250/382; 250/381; 250/573

[58] Field of Search ............... 250/381, 382, 384, 389, 250/574, 379, 573; 340/522, 629

[56] References Cited

U.S. PATENT DOCUMENTS

| | | | |
|---|---|---|---|
| 3,922,656 | 11/1975 | Harvath et al. | 340/522 |
| 4,069,018 | 1/1978 | Karna et al. | 23/232 |
| 4,288,790 | 9/1981 | Schnell | 250/574 |
| 4,405,919 | 9/1983 | Scheidweiler | 340/629 |

OTHER PUBLICATIONS

Armtec Brochure, "Omniguard" fire detectors, 1983.

*Fire Journal,* "The Technology of Infrared and Ultraviolet Detection", Jul. 1983, by Ron Hemond and Roger Wendt.

*Primary Examiner*—Carolyn E. Fields
*Attorney, Agent, or Firm*—Lane and Aitken

[57] ABSTRACT

In a method and apparatus for determining the fuel of a fire, an ionization detector is positioned to detect the ionization level in the fire gases. The natural logarithm of the ratio of the ambient ionization current when there is no fire to the change in ionization current from the ambient level is multiplied times a second characteristic, which may be the optical density, the change in carbon monoxide concentration from ambient, or the change in carbon dioxide concentration from ambient. The resulting product of this multiplication will be a value indicating the fuel being consumed in the fire. A chart recorder is connected to record the product of the multiplication.

9 Claims, 1 Drawing Figure

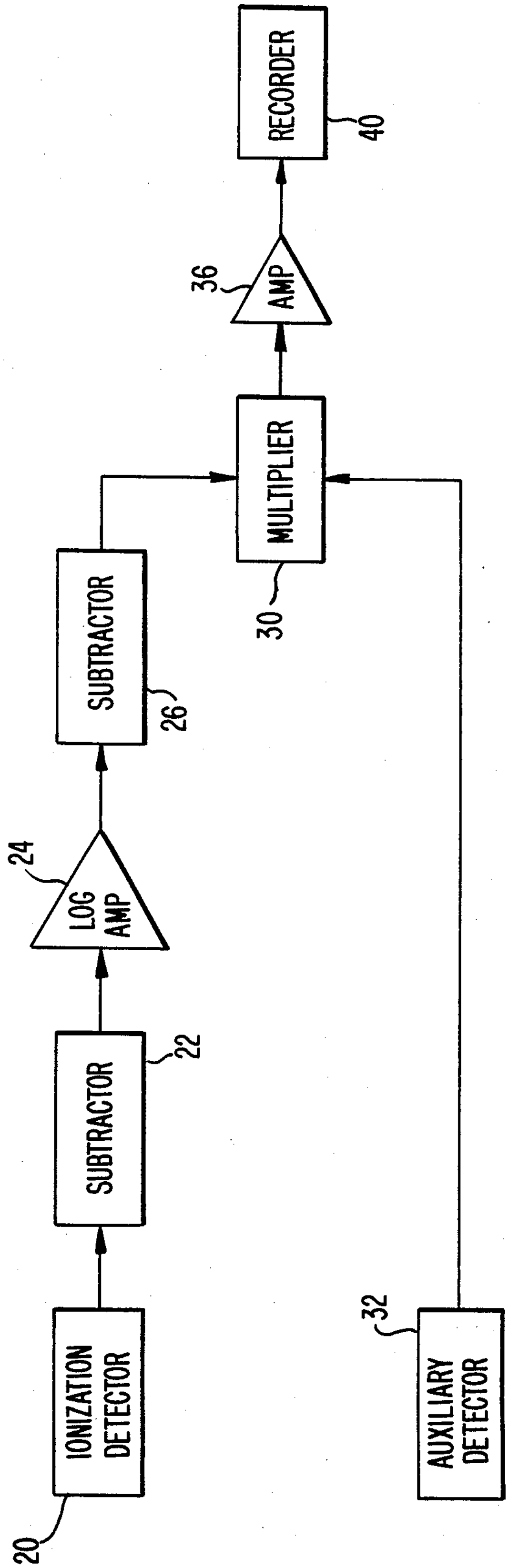
IONIZATION DETECTOR
20
SUBTRACTOR
22
LOG AMP
24
SUBTRACTOR
26
MULTIPLIER
30
AUXILIARY DETECTOR
32
AMP
36
RECORDER
40

FIRE IDENTIFICATION AND DISCRIMINATION METHOD AND APPARATUS

BACKGROUND OF THE INVENTION

The present invention relates to a fire detection method and apparatus and more particularly to a fire detection method and apparatus designed to provide an indication of the fuel being consumed in the fire.

DISCUSSION OF THE RELATED ART

Ionization fire detectors are well-known in the art. Dual band infrared (IR) fire detectors and dual band infrared/ultraviolet (IR/UV) fire detectors are also well known in the art. In such detections dual radiation bands are selected so that the transmitivity of ambient air to radiant energy in both these bands will be significantly affected by the presence of combustion products from a fire, but events other than a fire are unlikely to significantly affect transmitivity in both these bands simultaneously.

Some dual band IR and IR/UV fire detectors also screen such coincident changes in transmitivity for parallel or sequential confirmation of the coincidence, or for proportional "signature" relationships between them. However, the need to quickly locate the source or focus of the fire, in particularly to identify the chemical nature of that source of the fire, are important problems that these known devices do not address.

SUMMARY OF THE INVENTION

The present invention provides a method and apparatus for indicating the principal combustible material present in the fire at a given location. Knowledge of fuel being burned in a fire will assist fire fighting efforts in the selection of the optimum fire fighting tactic. It will also help discriminate against false alarms. Knowledge of the fuel being consumed at the beginning of a fire will help determine the origin of the fire. The preferred embodiment of the invention provides apparatus that can provide a record of the fuel being consumed throughout the history of the fire. In the case of arson, this record can be used as evidence of how the fire started.

In accordance with the invention an ionization detector is located to sense fire gases from a fire, and the ionization current produced in the ionization detector is monitored. Simultaneously a second characteristic, local optical density, the change in local carbon monoxide concentration from ambient, or the change in local carbon dioxide concentration from ambient is also monitored. The measured values are combined in a formula wherein the logarithm of the ratio of the ambient ionization current flowing in the ionization detector to the change in ionization current relative to ambient is multiplied by the second measured characteristic. The value of the resulting product provides an indication of the primary fuel for the fire.

Apparatus in accordance with the present invention comprises an ionization sensor producing an ionization current representing the ion concentration at a given location, signal processing means for determining the natural logarithm of the ratio of the ambient ionization current to the change in the ionization current from the ambient level, $\ln(I_o/\Delta I)$, and an auxiliary sensor for producing a signal representing the second characteristic at the given location. The first and second values are multiplied by a multiplier to provide an index value, which when a fire occurs will be indicative of the primary fuel of the fire. The index value may be recorded by a recorder to provide a time log of the index value.

BRIEF DESCRIPTION OF THE DRAWING

The nature and advantages of the present invention will be more clearly understood when the detailed description of the preferred embodiment given below is considered in conjuction with the drawing wherein:

The single FIGURE of drawing is a schematic diagram of apparatus in accordance with the preferred embodiment.

DETAILED DESCRIPTION OF THE PREFERRED EMBODIMENT

As shown in the drawing, the preferred embodiment of the present invention comprises an ionization detector 20, which is positioned in a location to detect ionization in gases from a fire. The output signal from the ionization detector 20 is applied to an analog subtractor 22, which has stored therein a previously measured reference value representing the ambient ionzation current $I_o$ flowing in the ionization detector 20 when there is no fire. The subtractor 26 subtracts the ambient ionization current value from the currently measured ionization current to provide an output signal representing the change ($\Delta I$) in the ionization current from ambient. This signal is amplified by a log amplifier 24 which has a gain characteristic such that its output signal will represent the natural logarithm of the input signal representing $\Delta I$. The output signal of the log amplifier 24 is applied to an analog subtractor 26, which has stored therein a previously determined reference value $\ln(I_o)$ representing the natural log of the ambient ionization current flowing in the ionization detector when there is no fire. This ambient reference value is determined by connecting the log amplifier 24 to amplify the output signal of the ionization detector 20 when there is no fire and then storing the resulting output of the log amplifier 24 as the ambient reference value in the subtractor 26. The subtractor 26 subtracts the current value of the output of the log amplifier 24 from the ambient reference value stored therein to provide an output signal representing $\ln(I_o/\Delta I)$. The output signal of the subtractor 26 is applied to a multiplier 30.

The multiplier 30 is also connected to an auxiliary sensor 32 located adjacent to the ionization sensor 20. This auxiliary sensor 32 may be an optical density (OD) sensor in one embodiment. Optical density is the natural logarithm of the inverse of the transmissivity in units of 1/meters at a selected wave length, which in the present invention is selected to be 0.6328 microns. The optical density sensor may comprise a source of a light beam at the selected wave length and a photodetector positioned to be irradiated by the beam arranged so that the fire gases to be analyzed pass through the beam. The photodetector is connected in a circuit to generate a signal varying inversely with the incident light intensity so that the output signal from the photodetector circuit represents the inverse of transmissivity. This signal is amplified by logarithmic amplifier having a natural logarithm gain characteristic to provide an out signal representing the optical density OD. The output of the optical density sensor is applied to the multiplier 30, which multiplies it times the output signal of the subtractor 26 to produce an output signal representing $[\ln(I_o/\Delta I)]$ OD. When a fire occurs and the fire gases are sensed by the ionization detector and the optical density detector, the product represented by the output signal of the multiplier 30 will provide an indication of the primary fuel being burned in the fire. In the preferred embodiment the signal output of the multiplier is boosted by an amplifier 36 and the amplified signal is then transmitted to a recording device located at a remote monitoring location such as chart recorder 40. The chart recordation provides a time log of the value of the multiplier output.

When a fire starts in an area where there are installed several signal generator units, each comprising an ionization detector 20, a subtractor 22, a log amplifier 24, a multiplier 30, and an auxiliary detector 32, connected as shown in the drawing, the change in the signal generated by each signal generator unit may be indicated by a pen on the recorder 40, each signal being recorded by a separate pen. All pens are zero-compensated and calibrated for gain so as to accurately record the value produced by each signal generator unit. With this arrangement, the location of the earliest deflections and the amount of the deflection of each pen will indicate which signal generator unit or units were affected when the fire began and the principal combustible material at each location, respectively, through time.

In alternative embodiments, the sensor 32 may be a carbon dioxide or carbon monoxide sensor instead of the optical density sensor. These sensors would preferably be infra-red photometers adapted to measure changes in the concentration of these gases in parts per million (ppm), relative to the ambient values of these concentrations when no fire exists although electrochemical cells or other means could also be used, as is well known in the art. In these alternative embodiments, the output of the sensor 32 representing the change in carbon dioxide concentration or the change in carbon monoxide concentration is multiplied in the multiplier 30 times the output of the subtractor 26 representing $\ln(I_o/\Delta I)$. Thus, when the sensor 32 is a carbon dioxide concentration detector, the output signal of the multiplier 30 will represent $[\ln(I_o/\Delta I)]\Delta C_{co2}$ wherein $\Delta C_{co2}$ represents the change in carbon dioxide concentration relative to ambient. When the sensor 32 is a carbon monoxide detector, the multiplier will produce an output signal representing $[\ln(I_o/\Delta I)]\Delta C_{co}$ in which $\Delta C_{co}$ is the change in carbon monoxide concentration relative to ambient. The table below shows how the values $[\ln(I_o/\Delta I)]OD$, $[\ln(I_o/\Delta I]\Delta C_{co2}$, and $[\ln\ (I_o/\Delta I)]\Delta C_{co}$ vary with different fuels being consumed in a fire.

TABLE

| Combustible | $[\ln(I_o/\Delta I)]OD$ | $[\ln(I_o/\Delta I)]\Delta C_{co2}$ | $[\ln(I_o/\Delta I)\Delta C_{co}$ |
|---|---|---|---|
| Douglas Fir | 1.0 | 1.0 | 1.0 |
| Heptane | 2.1 | 0.71 | 0.54 |
| Coal | 3.4 | 2.5 | 0.17 |
| Polyvinyl Chloride | 3.7 | 2.3 | 0.055 |
| Styrene Butadiene rubber | 7.1 | 4.8 | 0.23 |
| Polystyrene | 8.3 | 7.1 | 0.29 |

In this table, the output value of the multiplier 30 has been arbitrarily assigned the value of 1 when Douglas fur is the fuel being burned in the fire and the for the remaining fuels in the table represent the ratio of the output signal of the multiplier 30 to its value for Douglas Fir.

From the table it is apparent that each of the values $[\ln(I_o/\Delta I)]OD$, $[\ln(I_o/\Delta I]\Delta C_{co2}$, and $[\ln(I_o/\Delta I)]\Delta C_{co}$ varies widely depending upon the fuel of the fire and thus, will provide an accurate indication of the fuel. Thus, the time log of any one of these values recorded by the chart recorder 40 can be used as documentary evidence of the primary fuel of a fire at its beginning and as it progresses.

The invention has been disclosed with particular reference to specific embodiments employing analog circuitry. It will be appreciated that instead of employing analog circuitry to cdmpute the formula represented by the output of the multiplier 30, a microprocessor could be employed programmed to carry out the arithmetic functions and provide a digital output representing the value of the formula. Other variations and modifications of the method and apparatus can be made without departing from the spirit and scopt of the disclosed invention which is defined in the appended claims.

What is claimed is:

1. Fire detection apparatus comprising:

an ionization sensor producing an ionization current representing a first characteristic comprising the ion concentration at a given location;

signal processing means for determining the natural logarithm of the ratio of the ambient ionization current level to the change in ionization current from the ambient level, auxiliary sensor means producing a signal representing a second characteristic at said given location;

a multiplier connected to said signal processing means and said auxiliary sensor means, said multiplier producing a signal representing the product of the outputs of said processing means and auxiliary sensor means.

2. Fire detection apparatus as claimed in claim 1, wherein said auxiliary sensor means is an optical density sensor.

3. Fire detection apparatus as claimed in claim 1, wherein said auxiliary sensor means senses the concentration of carbon monoxide.

4. Fire detection apparatus as claimed in claim 1, wherein said auxiliary sensor means senses the concentration of carbon dioxide.

5. Fire detection apparatus as recited in claim 1, further comprising a recorder connected to record the output signal of said multiplier.

6. A method of determining the fuel of a fire comprising the steps of:

sensing the level of a first characteristic comprising ion concentration in the fire gases from said fire, determining the natural logarithm of the ratio of the ambient ionization level to the change in the ionization from the ambient level, sensing the level of a second characteristic of the fire gases;

multiplying said natural logarithm times said second characteristic to provide a product the value of which is indicative of the fuel of said fire.

7. A method as recited in claim 6, wherein said second characteristic is optical density.

8. A method as recited in claim 6, wherein said second characteristic is the change in carbon dioxide concentration from ambient.

9. A method as recited in claim 6, wherein said second characteristic is the change in carbon monoxide concentration from ambient.

* * * * *